US009183523B2

(12) United States Patent (10) Patent No.: US 9,183,523 B2
Cudak et al. (45) Date of Patent: Nov. 10, 2015

(54) RECOMMENDING ELECTRONIC CONTENT BASED UPON USER AVAILABILITY

(71) Applicant: International Business Machines Corporation, Armonk, NY (US)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 273 days.

(21) Appl. No.: 13/724,429

(22) Filed: Dec. 21, 2012

(65) Prior Publication Data

US 2014/0180991 A1 Jun. 26, 2014

(51) Int. Cl.
*G06Q 30/02* (2012.01)
*G06Q 30/06* (2012.01)
*G06N 5/02* (2006.01)
*G06Q 10/06* (2012.01)

(52) U.S. Cl.
CPC ...... *G06Q 10/06314* (2013.01); *G06Q 30/0264* (2013.01); *G06Q 30/0269* (2013.01); *G06Q 30/0631* (2013.01)

(58) Field of Classification Search
None
See application file for complete search history.

(56) References Cited

U.S. PATENT DOCUMENTS 5,697,793 A 12/1997 Huffman et al.
6,757,691 B1 6/2004 Welsh et al.
8,554,640 B1 * 10/2013 Dykstra et al. ............... 705/26.7
2003/0152894 A1 * 8/2003 Townshend ................... 434/178
2007/0292826 A1 12/2007 Goddy et al.
2009/0158342 A1 6/2009 Mercer et al.
2011/0125512 A1 5/2011 Huang
2012/0206472 A1 8/2012 Kandekar et al.
2014/0164593 A1 * 6/2014 Murray et al. ................ 709/224

OTHER PUBLICATIONS

"Application programming interface—Wikipedia, the free encyclopedia" [online] Nov. 25, 2012. Retrieved from the internet: <http://en.wikipedia.org/w/index.php?title=Application_programming_interface&oldid=524844559>.
France, C. "Best of E-book Readers & Managers". [online] Retrieved on: Nov. 14, 2012. Retrieved from the internet: <http://www.hongkiat.com/blog/ebook-reader-manager/>.
"Gunning fog index—Wikipedia, the free encyclopedia" [online] Nov. 14, 2012. Retrieved from the internet: <http://en.wikipedia.org/w/index.php?title=Gunning_fog_index&oldid=522962730>.
"Reading (process)—Wikipedia, the free encyclopedia". [online] Nov. 27, 2012. Retrieved from the internet: <http://en.wikipedia.org/w/index.php?title=Reading_(process)&oldid=525149444>.
"What is a Mail Server?". [online] Nov. 19, 2012. Retrieved from the internet: <http://whatismyipaddress.com/mail-server>. © 2000-2012 What Is My IP Address.

* cited by examiner

*Primary Examiner* — Jeffrey A Gaffin
*Assistant Examiner* — Mikayla Chubb
(74) *Attorney, Agent, or Firm* — Edward J. Lenart; Katherine S. Brown; Kennedy Lenart Spraggins LLP

(57) ABSTRACT

Embodiments of the present invention provide a system, method, and program product for recommending a digital publication. A computing device identifies a time interval for consuming a digital publication, based on schedule information in an electronic calendar. The computing device determines, based on characteristics of the time interval and a criteria, a digital publication, from a plurality of digital publications, for human consumption within the identified time interval.

14 Claims, 5 Drawing Sheets

| SUNDAY | MONDAY | TUESDAY | WEDNESDAY | THURSDAY | FRIDAY | SATURDAY |
|---|---|---|---|---|---|---|
| | | | | 1 | 2 NYC TRIP DURATION: 3HR 2PM - 5PM | 3 |

A

| TITLE | AUTHOR | GENRE | PROGRESS |
|---|---|---|---|
| A FEAST OF CROWS | GEORGE R. R. MARTIN | FANTASY | 100% |
| A GAME OF THRONES | GEORGE R. R. MARTIN | FANTASY | 100% |
| A STORM OF SWORDS | GEORGE R. R. MARTIN | FANTASY | 100% |
| A DANCE WITH DRAGONS | GEORGE R. R. MARTIN | FANTASY | 100% |
| A CLASH OF KINGS | GEORGE R. R. MARTIN | FANTASY | 0% |
| STEVE JOBS | WALTER ISAACSON | BIOGRAPHY | 17% |
| THE ALCHEMIST'S SECRET | SCOTT MARIANI | THRILLER | 0% |
| THE ODYSSEY | HOMER | FANTASY | 0% |
| JANE EYRE | CHARLOTTE BRONTË | GOTHIC FICTION | 30% |

B

TRIP - NYC, FRIDAY, MAY 2, 2012
ESTIMATED 3-HRS FOR READING

1. CURRENT SELECTION: JANE EYRE BY CHARLOTTE BRONTË
   ESTIMATED PROGRESS: CHAPTER 5-10 (3HRS)

2. ALTERNATIVE SELECTION: THE ODYSSEY BY HOMER
   ESTIMATED PROGRESS: (CHAPTER 1-3 (3HRS)

3. SUGGESTED SELECTION A: JANE EYRE BY CHARLOTTE BRONTË
   ESTIMATED PROGRESS A: CHAPTER 5-8 (2HRS)
   SUGGESTED SELECTION B: THE ODYSSEY BY HOMER
   ESTIMATED PROGRESS B: CHAPTER 1 (1HR)

RECOMMENDING ELECTRONIC CONTENT BASED UPON USER AVAILABILITY

FIELD OF THE INVENTION

The invention relates generally to the field of digital publications, and more particularly to recommending a digital publication.

BACKGROUND OF THE INVENTION

Digital publications, such as electronic books (ebooks), magazines, and journals, are popular formats for individuals to download content to a computing device, such as a mobile device, and read while the individual is on the go. In some cases, the individual has already begun reading an ebook and desires to continue reading the ebook selection. Mobile individuals in transition that desire additional electronic literature typically spend additional time manually searching for additional electronic content.

Ebooks are typically downloaded from an online website and stored locally on the computing device for subsequent viewing. An electronic reader (ereader) is required to view and or manipulate an ebook.

SUMMARY

Embodiments of the present invention provide a system, method, and program product for recommending a digital publication. A computing device identifies a time interval for consuming a digital publication, based on schedule information in an electronic calendar. The computing device determines, based on characteristics of the time interval and a criteria, a digital publication, from a plurality of digital publications, for human consumption within the identified time interval.

In certain embodiments, the characteristics of the time interval include: day of the week of the time interval; context of the time interval; start time and end time of the time interval; whether the time interval is indicated as available; or whether there is a time interval adjacent to the identified time interval that is indicated as available.

In other embodiments, context includes: purpose; whether the time interval is reoccurring; whether the time interval spans an entire day; or whether there is a special notation associated with the time interval.

In still other embodiments, the criteria includes: a user profile; a digital publication profile; or a purchase price range of a digital publication.

In additional embodiments, the user profile includes: user age; gender; education; health considerations; commute schedule; or digital publication recommendations.

In certain embodiments, the digital publication profile includes: genre; author; readability score; type of publication; prior downloaded digital publications; digital publication consumption time estimate; or historical digital publication consumption rate per unit of time.

In other embodiments, the readability score is determined based on one or more of: the Flesch formula; Dale-Chall formula; Gunning fog index; Fry readability graph; G. Harry McLaughlin's Smog Readability Formula; FORCAST formula; a predetermined reading rate; and a readability formula that measures the ease with which a publication can be read and understood by a human, or that measures the suitability of a publication for reading, understanding, or both by a human.

In still other embodiments, the computer determines, based on the characteristics of the time interval and the criteria, the extent of the human consumption possible within the identified time interval.

BRIEF DESCRIPTION OF THE SEVERAL VIEWS OF THE DRAWINGS

FIG. 2 depicts three exemplary illustrations, a user's calendar, contents of a digital publication store, and output of a digital publication recommending program, in accordance with an embodiment of the invention.

DETAILED DESCRIPTION

Figure 1:
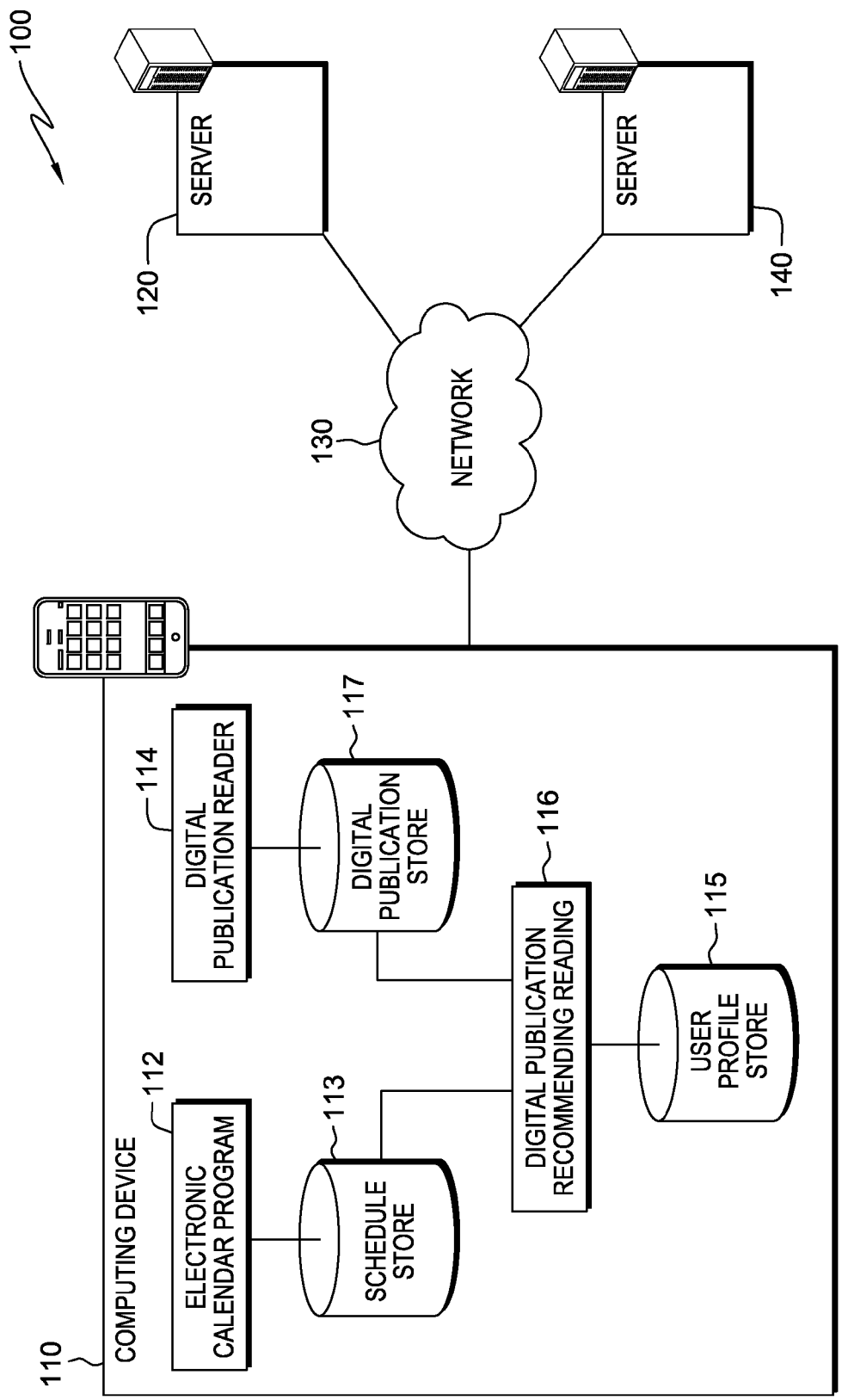
FIG. 1 is a functional block diagram illustrating a digital publication recommending environment, in accordance with an embodiment of the invention.

Digital publications, such as electronic books (ebooks), journals, and magazines, are text and image-based publications in digital form produced on, published by, and readable on a computing or other electronic device. Ebooks are often read on computing devices that utilize ebook reading software (ereader). Personal computers, mobile devices, such as smart phones and tablet computers, and other suitable devices may also be used for reading ebooks.

Users may not finish reading an ebook in a single sitting or reading session. Readers often need multiple reading sessions to finish reading an ebook. In some cases, busy readers may have only a limited time that they can dedicate to reading an ebook in one session. In other cases, a reader may have already started on an ebook or article and will pick up where they left off. However, for those in transition looking for the next ebook or electronic publication (epublication), a portion of the time that could be allotted to reading is instead spent searching for content rather than utilizing that time for reading.

Readability is the ease in which text, such as that contained in a digital publication, can be read and understood by a user. There are a plurality of formulas that determine readability, such as the Flesch formula, Dale-Chall formula, Gunning fog index, Fry readability graph; G. Harry McLaughlin's Smog Readability Formula; FORCAST formula. For example, the Gunning fog index estimates the years of formal training (i.e., the minimum required reading level) needed to understand a particular text on a first reading. For example, a Gunning fog index of 12 requires the reading level of a United States high school senior.

The Gunning fog index is calculated using equation [1].

$$I = [(words/sentences) + (complex\ words/words)] \qquad [1]$$

wherein I is the readability score and a complex word includes those words with three or more syllables, but does not include proper nouns, familiar jargon, or compounds words. Furthermore, a complex word neither includes common suffixes, such as -es, -ed, or -ing, as a syllable.

In describing embodiments of the invention, the phrases "time interval" and "timeslot" are used interchangeably. "Digital publication" and "digital publication selection" are also used interchangeably in describing embodiments of the invention.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions, which execute on the computer or other programmable apparatus, provide processes for implementing the functions/acts specified in the flowchart and/or block diagram block or blocks.

The invention will now be described in detail with reference to the Figures. FIG. 1 is a functional block diagram illustrating a digital publication predicting environment (DPPE), generally designated 100, in accordance with one embodiment of the invention. DPPE 100 includes computing device 110, and servers 120 and 140 connected over network 130. Network 130 can be, for example, a local area network (LAN), a wide area network (WAN) such as the Internet, or a combination of the two, and can include wired, wireless, or fiber optic connections. In general, network 130 can be any combination of connections and protocols that will support communications between computing devices 110 and 120.

Servers 120 and 140 are associated with network 130, in accordance with an embodiment of the invention. Servers 120 and 140 represent servers that provide software applications with services, such as security, data services, transaction support, load balancing, and management of distributed systems, to computing device 110.

Server 120 includes digital publications and/or digital publication suggestions. Digital publication suggestions can be based on recommendations, for example, those provided by a best seller listing, an author's new/related work, or price range. In an embodiment of the invention, server 120 can be associated with a proprietary entity, such as an online book store, wherein digital publications are distributed for a fee. In another embodiment, server 120 may be associated with a non-proprietary entity, such as a public library, whose distribution scheme is nonmonetary in nature.

Server 140 includes preferences, current and historic activities, and recommendations associated with digital publications, such as the title and/or author of an associate's reading selection. Server 140 provides social media applications to computing devices within DPPE 100, such as computing device 110, in accordance with an embodiment of the invention.

Computing device 110 represents a computing device utilized by a user to download, access, and/or view a digital publication, for example, an ebook, in accordance with an embodiment of the invention. Computing device 110 includes electronic calendar program 112, schedule store 113, digital publication store 117, digital publication reader 114, user profile store 115, and digital publication recommending program 116. In an embodiment, electronic calendar program 112 is associated with schedule store 113, an information repository that can include user-specific schedule or contact information. Electronic calendar program 112 represents software that includes an electronic calendar. Further, schedule store 113 includes a user's occupied and unoccupied timeslots and concomitant information, such as durational information, for example, a New York City trip from 2:00 PM until 5:00 PM. In an embodiment, schedule store 113 includes a time interval and concomitant characteristics, for example, day of the week, context, start and/or end time, whether the time interval is indicated as available, and/or whether there is a time interval adjacent to an identified time interval that is indicated as available. For example, context of a time interval can include purpose, such as work, personal, or special event, whether the time interval is recurring, whether the time interval spans the entire day, and/or whether there is any special notation associated with that particular time interval or adjacent time interval. For example, a human user is attending a conference in Las Vegas, Nev. and their cloud-based electronic calendar is unavailable before noon. The human user's cloud-based electronic calendar reflects a 3-hour available time interval beginning at noon and no availability after 3:00 PM due to the human user traveling to White Plains, N.Y. Here, contextual information about the time slot includes the White Plains travel plans, Las Vegas conference information, and/or the White Plains flight information.

Electronic calendar program 112 can store, via schedule store 113, a user's schedule, for example, their work schedule, leisure schedule, reading schedule, and/or appointment schedule. In general, electronic calendar program 112 can be any calendaring software capable of storing a user's work schedule, leisure schedule, reading schedule, and/or appointment schedule, according to an embodiment of the invention. Digital publication store 117 is associated with digital publication reader 114 and digital publication recommending program 116, in accordance with an embodiment of the invention.

Digital publication store 117 is an information repository that includes digital publications, for example, ebooks, electronic publications, and electronic articles, and concomitant information, for example genre, author, price, information that reflects whether a particular digital publication is currently being accessed by the user, and a user's reading progress as per a particular digital publication selection. In an embodiment, digital publication store 117 includes a digital publication profile. A digital publication profile includes genre, author, type of digital publication, prior downloaded digital publication, digital publication consumption time estimate, or historical digital publication consumption rate per unit of time.

Although not shown, digital publication store 117 can include a plurality of information repositories. In an embodiment, digital publication store 117 is associated with network 130. Digital publication reader 114 is included in computing device 110. Digital publication reader 114 includes digital publication store 117, in accordance with an embodiment of the invention. Digital publication reader 114 represents software utilized by a user to retrieve, access, via computing device 110, and/or view a digital publication within DPRP 116. Digital publication reader 114 can retrieve, via computing device 110, a digital publication from, for example, server 120.

Further, digital publication reader 114 can store a digital publication, for example, in digital publication store 117. Further still, digital publication reader 114 can retrieve and access a digital publication, for example, digital publications included in digital publication store 117 and server 120. Furthermore, digital publication reader 114 can display, via computing device 110, digital publications, in the form of one or more pages. Digital publication reader 114 may include a user interface (not shown) with which a user may access, view, and/or manipulate a digital publication. In general, digital publication reader 114 can be any software that can retrieve, access, store, and display digital publications, in accordance with an embodiment of the invention.

User profile store 115 is included in computing device 110 and associated with digital publication recommending program 116, in accordance with an embodiment of the invention. User profile store 115 represents an information repository that includes a user's digital publication preferences, for example, genre(s), price range, and information reflecting a user predetermined reading/education level. In an embodiment, user profile store 115 can include a user profile, purchase price range of a digital publication, and/or total cost of a digital publication purchase. User profile includes a user age, gender, education, health considerations, commute schedule, or digital publication recommendation.

DPRP 116, included in computing device 110, is associated with digital publication store 117, user profile store 115, and schedule store 113, in accordance with an embodiment of the invention. In an embodiment, DPRP 116 is software that determines the readability of a digital publication selection (selection) and, comparing the determination to a user's time constraints as reflected in the user's calendar, determines the extent to which the reader will be able to read the selection within a particular period of time and determine alternative selections, in accordance with an embodiment of the invention. In an embodiment, DPRP 116 is software that identifies a time interval for consuming a digital publication, based on schedule information in an electronic calendar, and determines, based characteristics of the time interval and a criteria, a digital publication, from a plurality of digital publications, for human consumption within the identified time interval.

DPRP 116 includes user profile store 115. DPRP 116 can determine a user's ability to read a portion of a desired digital publication, such as a chapter. DPRP 116 can determine a readability score (defined above) of a digital publication included in, for example, digital publication store 117 and/or server 120. In an embodiment, DPRP 116 can determine the reading level of a book and, comparing to a user's time constraints, (e.g., determined from their calendar), determine if the user will have free time to complete a portion of a digital publication in a given period of time and to possibly make an alternate reading recommendation. In an embodiment, DPRP 116 can identify a time interval for consuming a digital publication, based on schedule information included in an electronic calendar, for example, schedule information included in schedule store 113, and determine, based on characteristics of the time interval and concomitant criteria included in schedule store 113, a digital publication, from a plurality of digital publication included in digital publication store 117 and/or server 120, for human consumption within the identified time interval included in electronic calendar program 112.

For example, criteria can include the user profile, digital publication profile, or purchase price range of a digital publication. Purchase price range of a digital publication reflects the preferred purchase price range for a single digital publication recommended by DPRP 116 and/or the preferred price range for the total cost of a plurality of digital publications recommended by DPRP 116.

In an additional embodiment, DPRP 116 can determine an alternative selection. DPRP 116 can access schedule store 113, digital publication store 117, and digital publication store 117. In addition, DPRP 116 can access servers 120 and 140. DPRP 116 can access social media applications and concomitant information, for example, digital publication recommendations, included in server 140. Furthermore, DPRP 116 can determine a user's availability.

Concepts introduced in the following discussions of FIG. 2 will be used further in the discussion of FIG. 3, in the context of digital publication predicting environment 100 of FIG. 1. FIG. 2 illustrates an example wherein a user has a finite amount of free time to read a particular digital publication on a particular day and DPRP 116 determines the reader's ability to consume the digital publication within the allotted time frame. Specifically, FIG. 2 depicts three exemplary illustrations, a user's calendar, the contents of digital publication store 117, and output of DPRP 116, labeled A, B, and C, respectively, in accordance with an embodiment of the invention.

Illustration A is a depiction of the reader's schedule included in schedule store 113 that reflects an available three-hour timeslot on Friday, May 2, 2012, from 2:00 PM until 5:00 PM. To begin, the user executes digital publication reader 114 and selects *Jane Eyre* by Charlotte Brontë (the selection) for reading. DPRP 116 determines that the user has made the selection and the date and time of the selection (schedule information), 2:00 PM on Friday, May 2, 2012. In addition, DPRP 116 determines that the user has an available time interval from 2:00 PM until 5:00 PM for a total of three hours (unoccupied time) during a trip to New York City (characteristic of the time interval). In an alternative example, DPRP 116 identifies 2:00 PM until 5:00 PM on Friday, May 2012 as a time interval for consuming a digital publication. Subsequently, DPRP 116 accesses the selection included in digital publication reader 114 and determines the extent to which the user can consume the selection during the available time interval.

For example, DPRP 116 determines the readility score (RS), such as the Gunning fog index, of the selection and compares it to the users predefined education level (EDU). If DPRP 116 determines that EDU is greater than or equal to RS (i.e., user has sufficient education to read the selection), then DPRP 116 determines progress utilizing the average reading rate (ARR), 300 words per minute and equation [2].

$$W_t = T*ARR \quad [2]$$

wherein $W_t$ is the amount of words one can read within time, T.

Subsequently, DPRP 116 converts $W_t$ into pages of the selection. For example, a $W_t$ of 54,000 words corresponds to 120 pages in the selection for a selection formatted with 450 words per page. If DPRP 116 determines that EDU is less than RS (user does not have sufficient education to render the selection suitable, for example, suitability of a selection can mean the ease at which a reader can read and comprehend the selection, and/or the satisfaction that the reader can expect to derive from the selection), then DPRP 116 displays a warning and determines an alternative digital publication selection (alternative selection). In another embodiment, if DPRP 116 determines that EDU is less than RS, then DPRP 116 displays both a warning and the selection, and determines an alternative selection.

DPRP 116 determines the genre of the selection, accesses digital publications included in digital publication store 117 (illustration 2B), and determines which digital publications are of the same/similar genre as the selection (alternative selection), determines the estimated progress for the alternative selection, and displays the alternative selection and determined estimated progress. In an alternative example, DPRP 116 determines the digital publications depicted in illustration 2B based on characteristics of the time interval (New York Trip on Friday, May 2, 2012, from 2:00 PM until 5:00 PM) included in schedule store 113, a user profile (defined above), included in user profile store 115, digital publication profile associated with the selection, such as genre (Gothic fiction) and author (Charlotte Brontë), and preferred purchase price range, such as twenty dollars, included in digital publication store 117. In particular, DPRP 116 determines estimated progress in illustration C utilizing equation [2] discussed above.

In an example, digital publications are included in digital publication store 117 and/or server 120. DPRP 116 can determine an alternative selection by accessing the digital publication suggestions included in servers 120 and 140. Here, DPRP 116 communicates, for example, using an application programming interface, with an application included in server 120 and determines recently/highly downloaded digital publications of a similar/the same genre included in digital publication store 117, and displays the title and author of the determined digital publications.

Illustration 2C is a snapshot of the selection and alternative selections displayed, via computing device 110, by DPRP 116. Illustration 2C includes the time, date, and duration of the available time interval. Illustration 2C also includes a first option, the user's current selection, *Jane Eyre* by Charlotte Brontë, and a determined progress estimate, chapters 5-10, within three hours. Illustration 2C also includes a first alternative selection, *The Odyssey* by Homer, and a determined progress, chapters 1-3 within three hours. Illustration 2C also includes a second alternative selection, wherein the user may consume a portion, chapters 5-8, of the first option, *Jane Eyre* by Charlotte Brontë, within two hours; and a portion, chapter one, of the first alternative selection, *The Odyssey* by Homer, within one hour.

In an alternative embodiment, DPRP 116 may re-analyze the selection based on, for example, whether updates occur to the user profile, digital publication profile, purchase price range for a digital publication, computing device 110 usage, or internet connectivity during the available time interval. In an additional embodiment, DPRP 116 may re-analyze the selection based on, for example, whether the user has a subsequent activity and/or event scheduled the purchase price of the alternative selection, availability of a selection, or user health considerations. For example, user health considerations can include biometric gathered data or user-provided data on heart rate, blood pressure, and/or stress levels.

Figure 3:
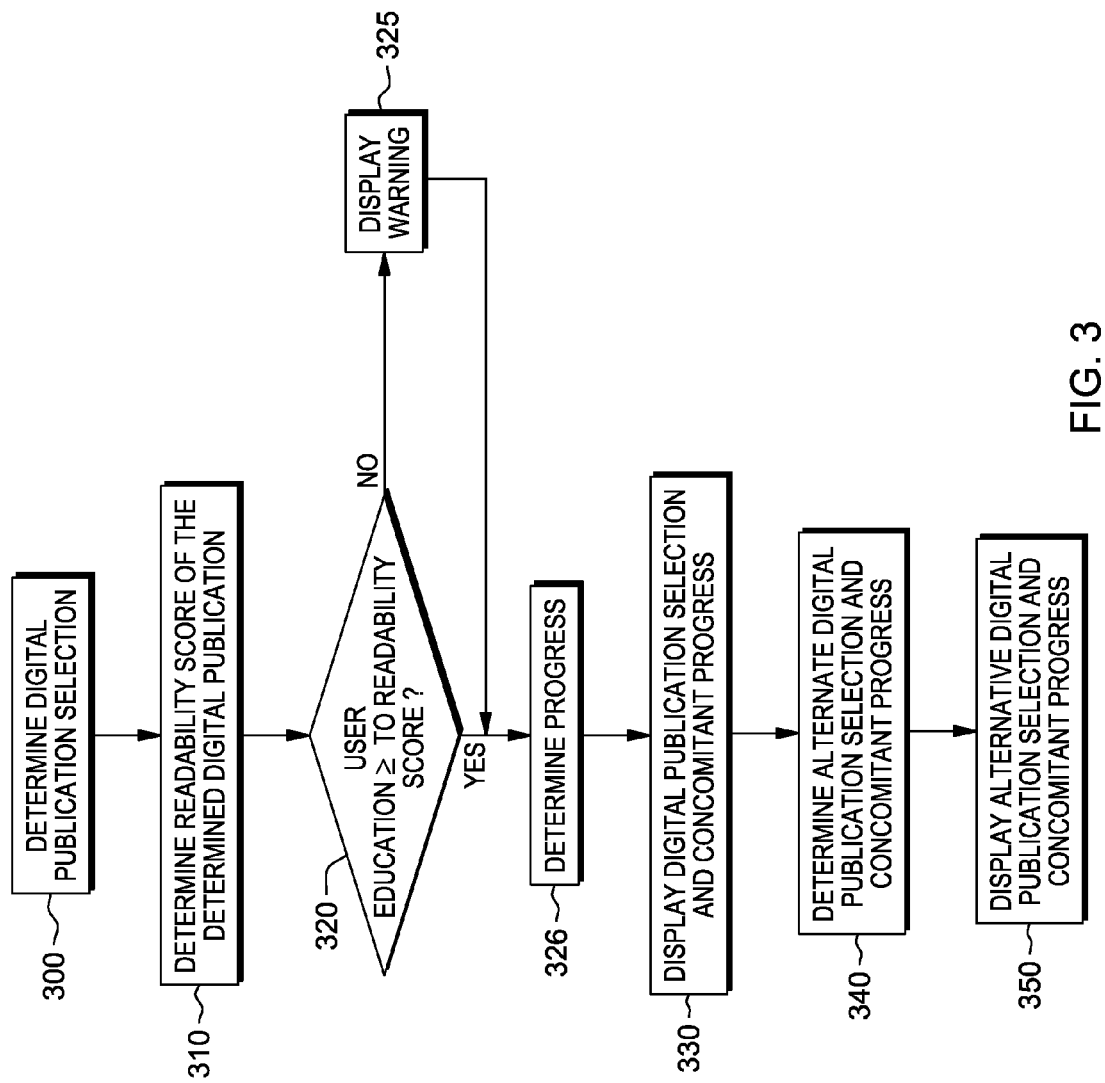
FIG. 3 is a flowchart depicting the operational steps that a digital publication recommending program, running on a computing device, takes for recommending digital publication content, in accordance with an embodiment of the invention.

FIG. 3 is a flowchart depicting the operational steps that DPRP 116, running on computing device 110, takes for recommending digital publication content, in accordance with an embodiment of the invention. DPRP 116 determines which digital publication the user is currently accessing (step 300). DPRP 116 determines the readability score of the accessed digital publication (step 310). DPRP 116 determines whether the user has sufficient education to render the selection suitable (decisional 320). If DPRP 116 determines that the user does not have sufficient education to render the selection suitable ("no" branch, decisional 320), then DPRP 116 displays a warning (step 325) and determines the progress of the accessed digital publication (step 326).

However, if DPRP 116 determines that the user has sufficient education to render the selection suitable ("yes" branch, decisional 320), then DPRP 116 executes step 326 (discussed above). Subsequently, DPRP 116 displays the digital publication and concomitant progress (step 330) determines an alternative digital publication selection for the user (step 340). Subsequently, DPRP 116 displays the alternative digital publication selection and concomitant determined progress (step 350).

Figure 4:
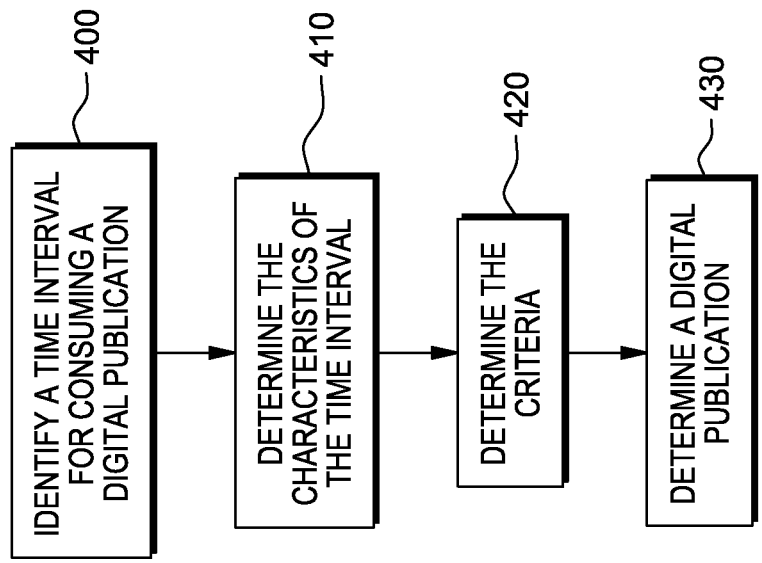
FIG. 4 is a flowchart depicting the operational steps that a digital publication recommending program, running on a computing device, takes for recommending digital publication content, in accordance with an embodiment of the invention.

FIG. 4 is a flowchart depicting the operational steps that DPRP 116, running on computing device 110, takes for recommending digital publication content, in accordance with an embodiment of the invention. DPRP 116 identifies a time interval for consuming a digital publication (step 400). DPRP 116 determines the characteristics of the time interval (step 410). DPRP 116 determines the criteria (step 420). Subsequently, DPRP 116 determines a digital publication (step 430).

Figure 5:
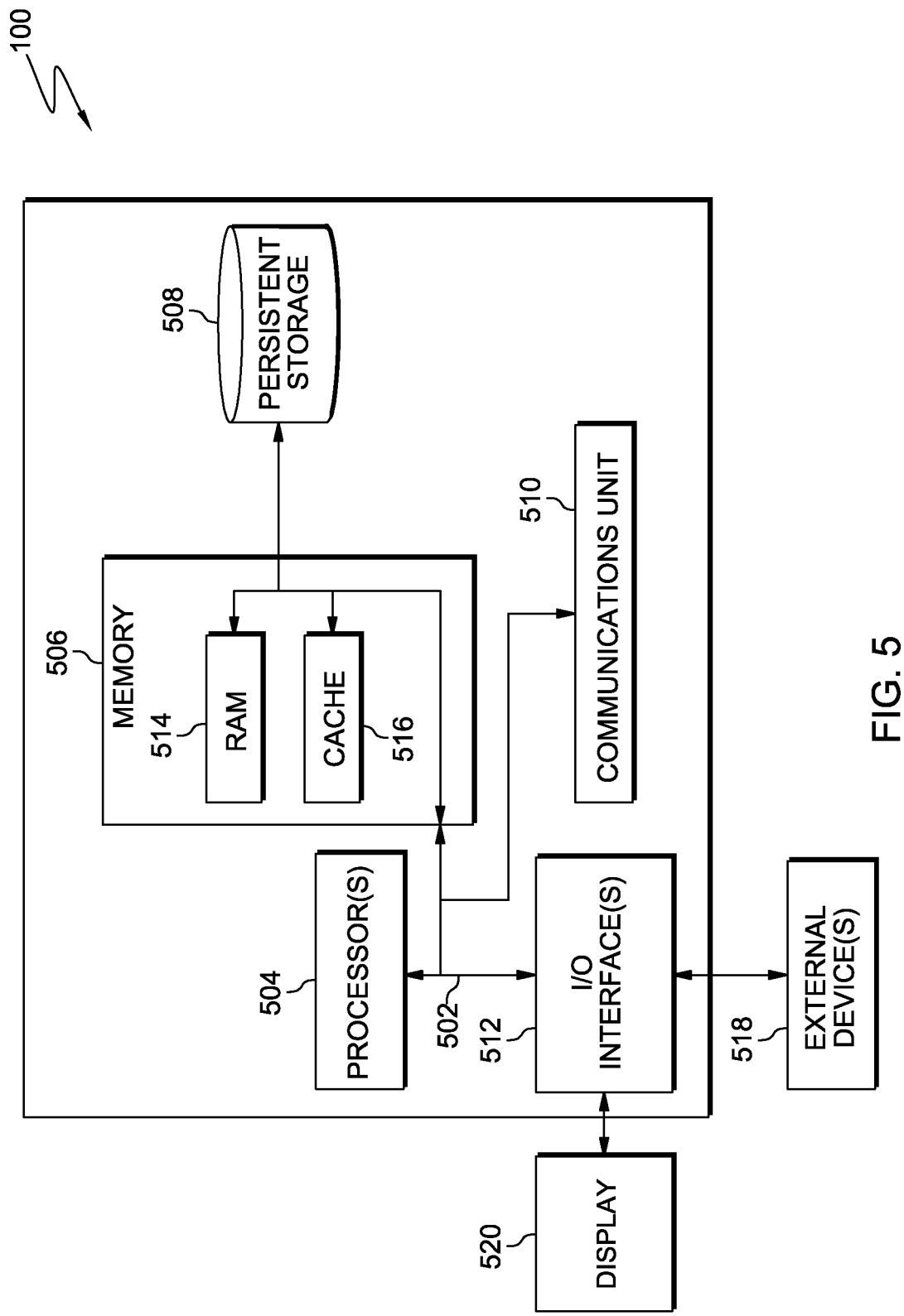
FIG. 5 depicts a block diagram of components of the computing device executing the digital publication recommending program, in accordance with an embodiment of the invention.

FIG. 5 depicts a block diagram of components of computing device 110, in accordance with an illustrative embodiment of the invention. It should be appreciated that FIG. 5 provides only an illustration of one implementation and does not imply any limitations with regard to the environments in which different embodiments may be implemented. Many modifications to the depicted environment may be made.

Computing device 110 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

DPRP 116 is stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including application server 120. In these examples, communications unit 510 includes one or more network interface cards. Communications unit 510 may provide communications through the use of either or both physical and wireless communications links. DPRP 116 may be downloaded to persistent storage 508 through communications unit 510.

I/O interface(s) 512 allows for input and output of data with other devices that may be connected to server computer 102. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the invention, e.g., DPRP 116, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An apparatus comprising:
a computer processor and a computer memory, the computer memory including computer program instructions that when executed by the computer processor cause the apparatus to carry out the steps of:
identifying a time interval for consuming a digital publication, based on schedule information in an electronic calendar;
selecting, based on characteristics of the time interval and a criteria, a digital publication, from a plurality of digital publications, for human consumption within the identified time interval, wherein the characteristics of the time interval include a context indicating a purpose of the time interval;
determine, based on the characteristics of the time interval and the criteria, an extent of the human consumption possible within the identified time interval; and determine an alternative digital publication selection based on the determination of the extent of the human consumption possible within the identified time interval.

2. The apparatus of claim 1, wherein the characteristics of the time interval further include one or more of:
- day of the week of the time interval;
- start time and end time of the time interval;
- whether the time interval is indicated as available; or
- whether there is a time interval adjacent to the identified time interval that is indicated as available.

3. The apparatus of claim 1, wherein the context further includes one or more of:
- whether the time interval is reoccurring;
- whether the time interval spans an entire day; or
- whether there is a special notation associated with the time interval.

4. The apparatus of claim 1, wherein the criteria includes one or more of:
- a user profile;
- a digital publication profile; or
- a purchase price range of a digital publication.

5. The apparatus of claim 4, wherein the user profile includes one or more of: user age; gender; education; health considerations; commute schedule; or digital publication recommendations.

6. The apparatus of claim 4, wherein the digital publication profile includes one or more of: genre; author; readability score; type of publication; prior downloaded digital publications; digital publication consumption time estimate; or historical digital publication consumption rate per unit of time.

7. The apparatus of claim 6, wherein the readability score is determined based on one or more of: Flesch formula; Dale-Chall formula; Gunning fog index; Fry readability graph; G. Harry McLaughlin's Smog Readability Formula, FORCAST formula; a predetermined reading rate; and a readability formula that measures ease with which a publication can be read and understood by a human, or that measures suitability of a publication for reading, understanding, or both by a human.

8. A computer program product comprising a computer readable storage medium, wherein the computer readable storage medium is not a signal, wherein the computer readable storage medium includes computer program instructions that when executed by a computer cause the computer to carry out the steps of:
- identifying a time interval for consuming a digital publication, based on schedule information in an electronic calendar;
- selecting, based on characteristics of the time interval and a criteria, a digital publication, from a plurality of digital publications, for human consumption within the identified time interval, wherein the characteristics of the time interval include a context indicating a purpose of the time interval;
- determine, based on the characteristics of the time interval and the criteria, an extent of the human consumption possible within the identified time interval; and
- determine an alternative digital publication selection based on the determination of the extent of the human consumption possible within the identified time interval.

9. The computer program product of claim 8, wherein the characteristics of the time interval further include one or more of:
- day of the week of the time interval;
- start time and end time of the time interval;
- whether the time interval is indicated as available; or
- whether there is a time interval adjacent to the identified time interval that is indicated as available.

10. The computer program product of claim 8, wherein the context further includes one or more of:
- whether the time interval is reoccurring;
- whether the time interval spans an entire day; or
- whether there is a special notation associated with the time interval.

11. The computer program product of claim 8, wherein the criteria includes one or more of:
- a user profile;
- a digital publication profile; or
- a purchase price range of a digital publication.

12. The computer program product of claim 11, wherein the user profile includes one or more of: user age; gender; education; health considerations; commute schedule; or digital publication recommendations.

13. The computer program product of claim 11, wherein the digital publication profile includes one or more of: genre; author; readability score; type of publication; prior downloaded digital publications; digital publication consumption time estimate; or historical digital publication consumption rate per unit of time.

14. The computer program product of claim 13, wherein the readability score is determined based on one or more of: Flesch formula; Dale-Chall formula; Gunning fog index; Fry readability graph; G. Harry McLaughlin's Smog Readability Formula; FORCAST formula; a predetermined reading rate; and a readability formula that measures ease with which a publication can be read and understood by a human, or that measures suitability of a publication for reading, understanding, or both by a human.

\* \* \* \* \*